United States Patent

Sayegh

Patent Number: 6,075,826
Date of Patent: Jun. 13, 2000

[54] METHOD AND APPARATUS FOR OBTAINING INITIAL CARRIER AND SYMBOL PHASE ESTIMATES FOR USE IN SYNCHRONIZING TRANSMITTING DATA

[75] Inventor: Soheil I. Sayegh, Gaithersburg, Md.

[73] Assignee: Comsat Corporation, Bethesda, Md.

[21] Appl. No.: 09/076,762

[22] Filed: May 13, 1998

[51] Int. Cl.[7] .............................. H04L 27/14; H04L 27/16
[52] U.S. Cl. .......................... 375/326; 375/332; 329/304
[58] Field of Search ................................... 375/326, 330, 375/331, 332; 329/304

[56] References Cited

U.S. PATENT DOCUMENTS

| | | | |
|---|---|---|---|
| 4,313,205 | 1/1982 | Rhodes . | |
| 4,847,869 | 7/1989 | Labedz et al. . | |
| 4,856,027 | 8/1989 | Nakamura et al. . | |
| 4,885,756 | 12/1989 | Fontanes et al. . | |
| 5,001,727 | 3/1991 | McDavid | 375/326 |
| 5,131,008 | 7/1992 | Kazecki et al. | 375/326 |
| 5,170,415 | 12/1992 | Yoshida et al. | 375/326 |
| 5,272,446 | 12/1993 | Chalmers et al. | 324/304 |

OTHER PUBLICATIONS

S.A. Rhodes et al.; "Digital On–Board Demodulator for Reception of an Up–Link Group of TDMA/QPSK Channels"; Apr. 1989; pp. 1–8.

*Primary Examiner*—Don N. Vo
*Attorney, Agent, or Firm*—Sughrue, Mion, Zinn, Macpeak & Seas, PLLC

[57] ABSTRACT

A method and apparatus for determining initial carrier and symbol phase estimates in a burst mode digital communication system are described. In-phase and quadrature sample of a BPSK preamble are sampled to obtain correlation values. Next, sum and differences of the correlation values are obtained. Then the initial carrier phase estimate (THETAHAT) and the initial symbol phase estimate (TAUHAT) are obtained through application of an algorithm. The apparatus that implements the method consists of adders, inverters, arc tangent look-up tables and divide by 2 logic units.

8 Claims, 4 Drawing Sheets

METHOD AND APPARATUS FOR OBTAINING INITIAL CARRIER AND SYMBOL PHASE ESTIMATES FOR USE IN SYNCHRONIZING TRANSMITTING DATA

BACKGROUND OF THE INVENTION

1. Field of Invention

This invention relates to burst mode digital communication systems where data transmission is preceded by an alternating binary phase shift keying (BPSK) preamble for rapid acquisition of carrier and symbol synchronization. The preamble is sampled and the set of samples obtained are processed to provide carrier and symbol phase estimates.

2. Description of Related Art

One of the techniques used in burst mode digital communication systems is time division multiple access (TDMA). This technique allows multiple users to share a single communication channel. Each user is assigned a time slot in which to transmit data. The time slot is measured from a frame marker which repeats at a fixed period. The time slot can be variable in length and can be preassigned or assigned as needed on demand.

To control and configure a TDMA system, a time interval called a is frame is defined. A frame is divided into time slots, and a burst consists of an integer number of slots. Bursts typically consist of a preamble, a unique word and random symbol data (message portion).

A receiver uses the preamble to synchronize its processor with the time and frequency of the signal it is receiving. A preamble consists of a signal interval for carrier and symbol-timing recovery and a unique word for burst synchronization and other symbols.

In order to establish communications, carrier and symbol synchronization must take place. A digitally implemented BPSK demodulator, a portion of which is shown in FIG. 1, performs these functions. The basic functions of the different elements are as follows.

A sampling interpolator unit 1 calculates output sample components, X and Y, twice per symbol at the instants defined by the timing reference from the symbol synchronizer. In some implementations, the interpolator is removed and the analog-to-digital converter sampling times are defined by the timing reference.

A coherent demodulator unit 3 provides soft decision sample values to a decoder that follows.

A system timing unit 5 controls the timing of the carrier and symbol acquisition and synchronization functions.

A carrier and symbol acquisition unit 2 generates initial carrier and phase estimates that are input into a carrier synchronizer unit 4 and symbol synchronizer unit 6, respectively.

A carrier synchronization unit 4 generates a reference carrier with a phase closely matching that of the data signal. It provides the estimates of carrier frequency and phase which are necessary for coherent demodulation.

A symbol synchronizer unit 6 provides the timing reference required for sampling at the correct intervals so that bit decisions can be made on the data symbols. Further information on burst demodulators is contained in an article by S. A. Rhodes and S. I. Sayegh entitled, "Digital On-board Demodulator for Reception of an Up-link Group of TDMA/QPSK Channels," Proceedings of ICDSC8, Guadalupe, F.W.I., April 1989, which is incorporated herein by reference.

The present invention is related to the carrier and symbol acquisition functions.

TDMA system timing prior to signal acquisition is assumed to be available with an accuracy of a few symbol intervals. This timing is used to gate the acquisition and tracking modes for carrier and symbol synchronization.

Complex time domain samples, Z=X+jY, are used to represent the quadrature components of a received signal, after demodulation, with a carrier reference of approximately the correct frequency, but an arbitrary phase angle. Quadrature samples of the desired channel are input to a sample interpolator at a rate of approximately three complex samples per symbol. Another input to the sample interpolator feeds back the estimated symbol timing from the symbol synchronizer.

In-phase and quadrature samples of the BPSK preamble are sampled at the rate of $N_S$ complex (in-phase and quadrature) samples per symbol, where $N_S$ is typically (but not necessarily) equal to 2 samples per symbol.

Denoting the carrier phase by $\theta_R$, and the clock phase by $T_R$, and noting that the received filtered alternating preamble is sinusoidal, the following expressions may be written:

$$X_n = cos(\theta_R)*cos(\pi R_s nT + T_R)$$

$$Y_n = sin(\theta R)*cos(\pi R_s nT + T_R)$$

where $X_n$ is the in-phase sample, $Y_n$ is the quadrature sample, $R_s$ is the symbol rate, and T the sampling interval.

These samples are correlated with samples from a sine and a cosine waveform that have the same period as the alternating BPSK preamble, namely with $sin(\pi R_s nT)$ and $cos(\pi R_s nT)$.

Correlating the in-phase received samples with a sine and a cosine waveform produce odd and even in-phase sample correlations $X_o$ (odd) and $X_E$ (even), respectively, as shown below. Similarly, correlating the quadrature received samples with a sine and a cosine waveform produce odd and even quadrature sample correlations $Y_O$ (odd) and $Y_E$ (even), respectively, as shown below:

$$X_o = -cos(\theta_R)*sin(T_R)$$

$$X_E = cos(\theta_R)*cos(T_R)$$

$$Y_o = -sin(\theta_R)*sin(T_R)$$

$$Y_E = sin(\theta_R)*cos(T_R)$$

These correlations result in four correlations values $X_O$, $X_E$, $Y_O$, and $Y_E$. In the absence of a significant frequency offset, these four values are sufficient to derive the desired initial carrier and symbol phase estimates.

Two algorithms are readily available for processing the preamble samples. However, the first algorithm is overly sensitive to any amplitude slope that may be present over a non-equalized communication channel. The second algorithm is not sensitive to amplitude slope, however, it requires more hardware than the present invention to implement.

The purpose of the invention is to provide a method and apparatus for obtaining initial carrier and symbol phase estimates that can be easily implemented with a minimal amount of hardware. This is accomplished by deriving the maximum likelihood algorithms and mapping them into an easily implementable set of equations. The actual hardware implementation is described in the detailed description section.

All of algorithms discussed here (the existing two and the subject of the invention) use the four correlation values $X_O$, $X_E$, $Y_O$, and $Y_E$ to derive the desired initial carrier and symbol phase estimates. The differences among the three algorithms lie in how the four values are processed.

Once obtained, these initial carrier and clock phase estimates initialize the synchronizers at the end of the preamble. These initialization values represent memory inherent in the accumulators for the phase-locked loops that are used in the tracking mode of synchronization.

In existing algorithm 1, the initial carrier phase estimate (THETAHAT) and initial symbol phase estimate (TAUHAT) are obtained as follows:

$$ANUM = \sqrt{((Y_O * Y_O) + (Y_E * Y_E))}$$
$$ADEN = \sqrt{((X_O * X_O) + (X_E * X_E))}$$
$$THETAHAT = \arctan(ANUM/ADEN)$$
$$TESTA = (X_E * Y_E) + (X_O * Y_O)$$
IF (TESTA < O), THETAHAT = −THETAHAT
$$BNUM = \sqrt{((X_O * X_O) + (Y_O * Y_O))}$$
$$BDEN = \sqrt{((X_E * X_E) + (Y_E * Y_E))}$$
$$TAUHAT = \arctan(BNUM/BDEN)$$
$$TESTB = -((X_E * X_O) + (Y_E * Y_O))$$
IF (TESTB < O), TAUHAT = −TAUHAT The main problem with this algorithm is that in the presence of an amplitude slope over the communications channel, the estimates obtained by the algorithm may be grossly inaccurate. FIG. 2 illustrates this fact by showing how the estimated value of the angle (THETAHAT or TAUHAT) is significantly different from the actual value ($\theta_R$ or $T_R$), if an amplitude slope of a few dBs is present on the link.

In existing algorithm 2, the initial carrier and symbol phase estimates are obtained by the following expressions:

$$ANUM=2((X_o*Y_o)+(X_E*Y_E))$$
$$ADEN=(X_E*X_E)-(Y_E*Y_E)+(X_O*X_O)-(Y_o*Y_O)$$
$$THETAHAT=0.5\arctan(ANUM/ADEN)$$
$$BNUM=-2((X_O*X_E)+(Y_o*Y_E))$$
$$BDEN=(X_E*X_E)+(Y_E*Y_E)-(*X_O*X_O)-(Y_O*Y_O)$$
$$TAUHAT=0.5\arctan(BNUM/BDEN)$$

Implementation of this algorithm results in more accurate estimates, however, it requires more hardware than algorithm 1, making it unattractive for applications requiring a compact implementation.

SUMMARY OF THE INVENTION

The method of the present invention develops initial carrier and symbol phase estimates by first obtaining the sum and differences of the correlation values. Then the initial carrier phase estimate (THETAHAT) and the initial symbol phase estimate (TAUHAT) are obtained, as shown below.

$$ANUM=Y_E-X_O$$
$$ADEN=X_E+Y_O$$
$$SUMANG=\arctan(ANUM/ADEN)$$
$$BNUM=Y_E+X_O$$
$$BDEN=X_E-Y_O$$
$$DIFANG=\arctan(BNUM/BDEN)$$
$$THETAHAT=0.5(SUMANG+DIFANG)$$
$$TAUHAT=0.5(SUMANG-DIFANG)$$

The apparatus of the present invention consists of adders, inverters, arc tangent look-up tables and divide by 2 logic units.

DETAILED DESCRIPTION OF THE INVENTION

Figure 1:
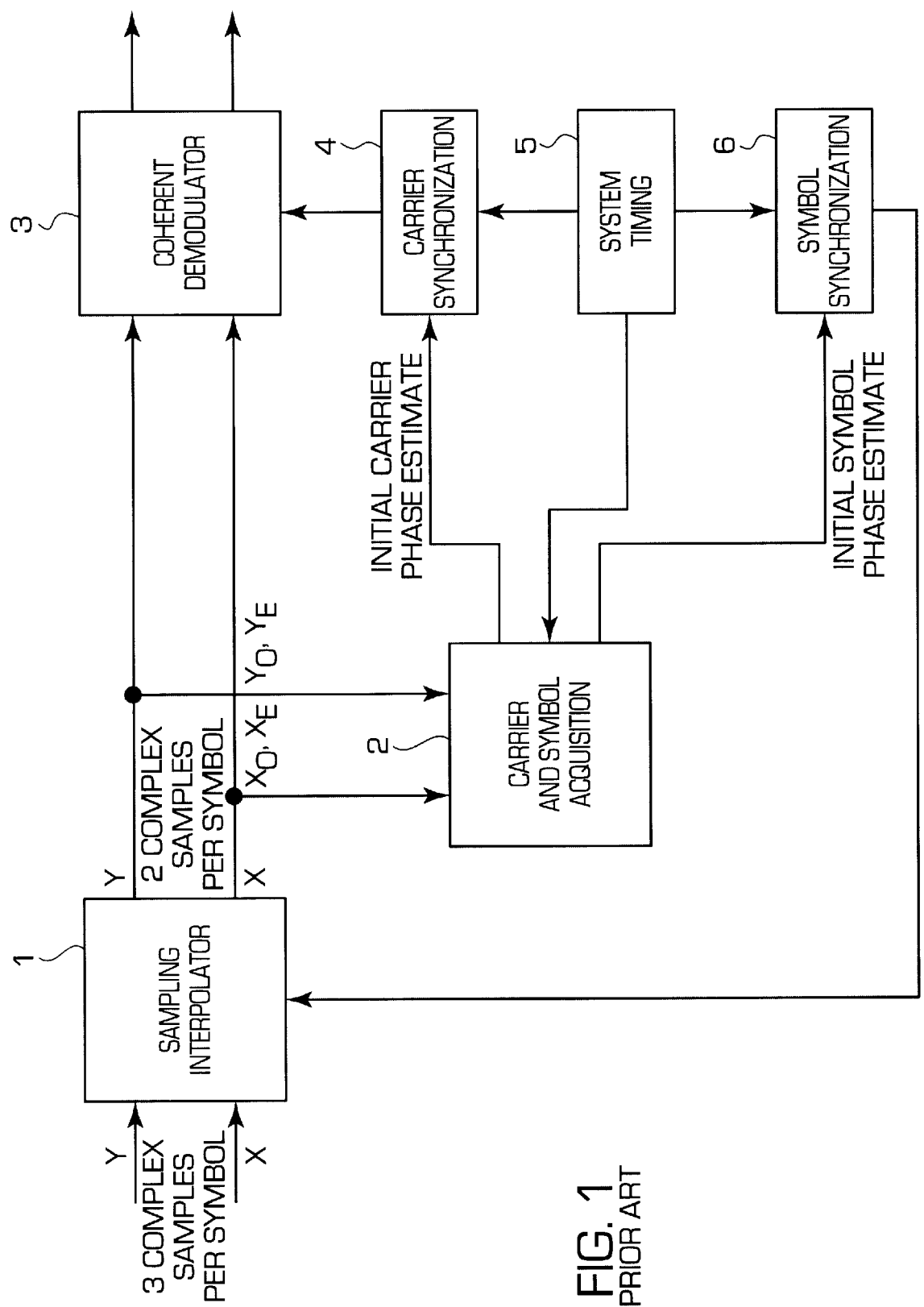
FIG. 1 is a diagram of a portion of a demodulator.
Figure 2:
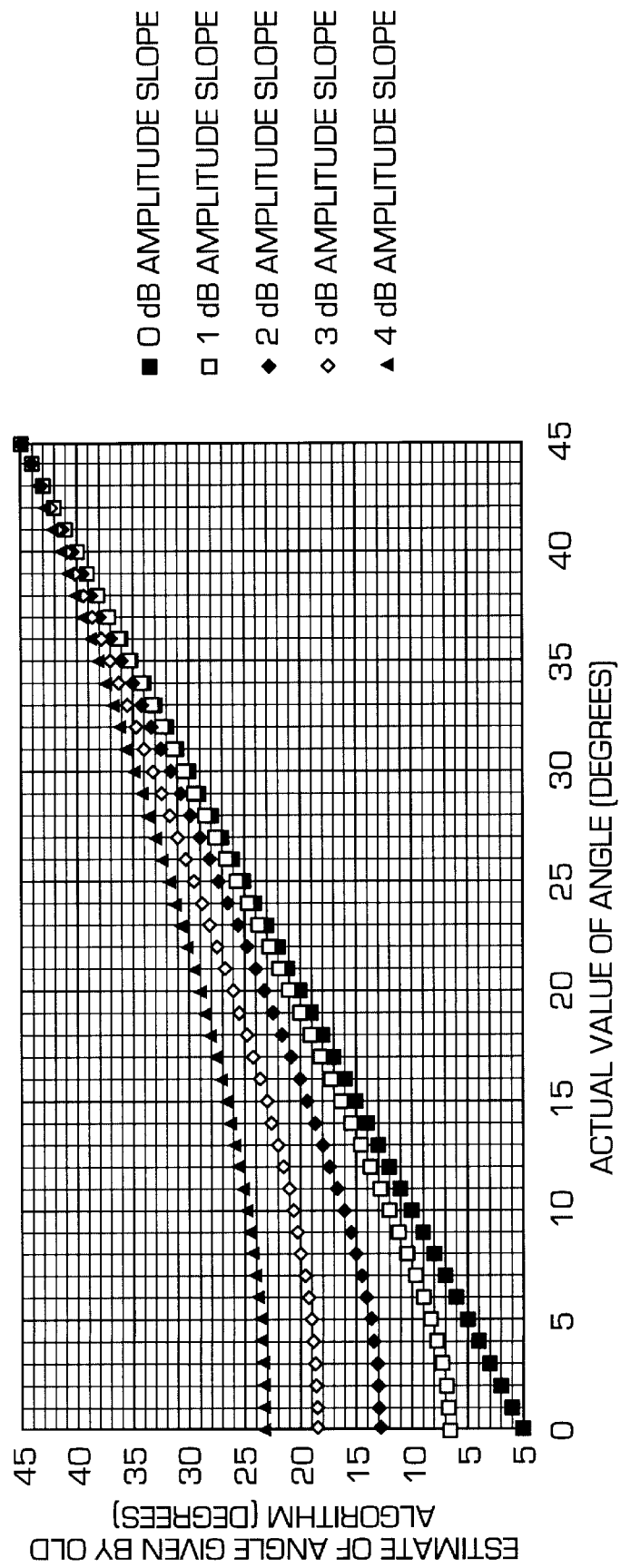
FIG. 2 is a diagram showing the error caused when using the first algorithm when there is an amplitude slope in the link.
Figure 3:
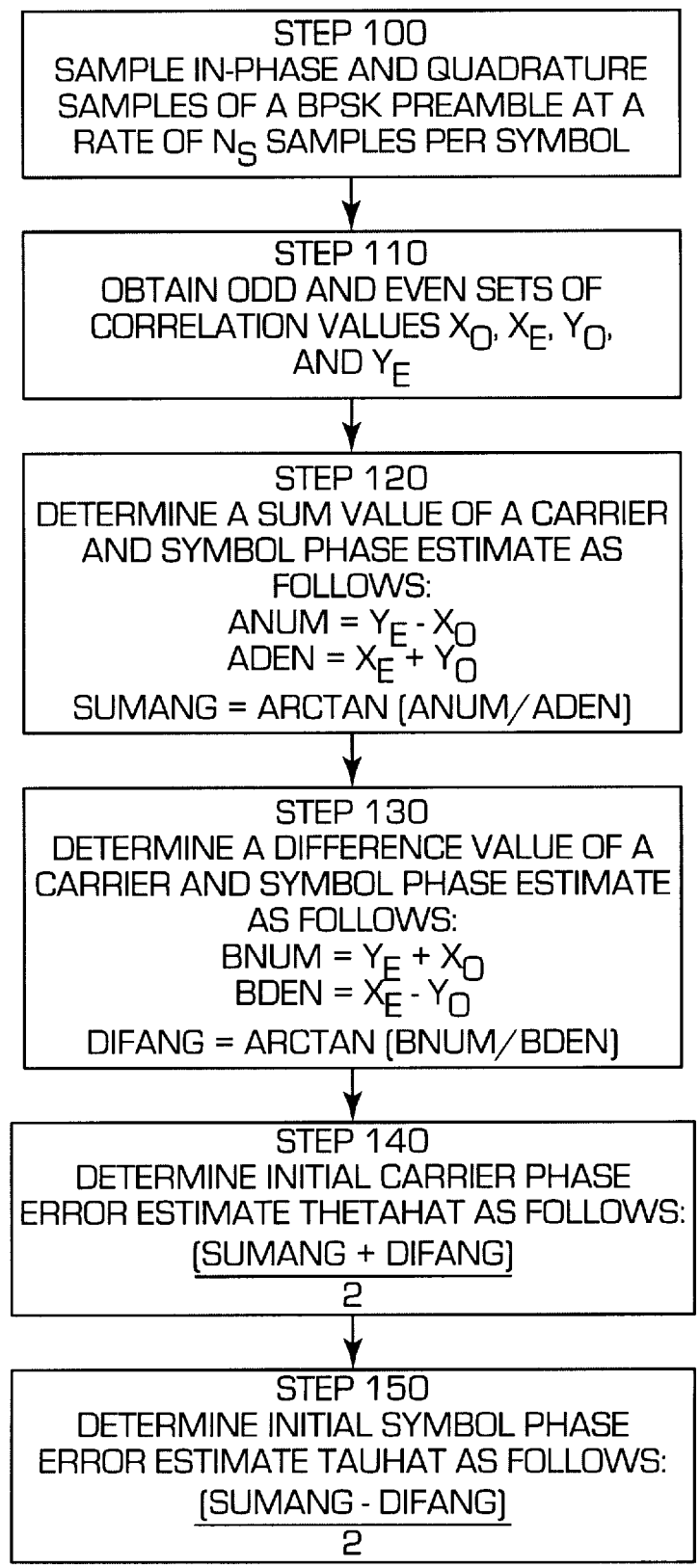
FIG. 3 is a flow chart of the method for obtaining the carrier and symbol phase error estimates.

The present invention combines the accuracy and robustness of algorithm 2, with the simple implementation of algorithm 1. This is done by using a method that obtains sum and difference values of the correlation values and then determining the initial carrier and symbol phase estimates. Refer to FIG. 3.

The first step involves sampling in-phase and quadrature samples of a BPSK preamble at a rate of $N_S$ samples per symbol, wherein $N_X$ is an integer greater than 1 (step 100). Next, odd and even sets of correlation values $X_O$, $X_E$, $Y_O$ and $Y_E$ are obtained (step 110). After that, a sum of a carrier and symbol phase estimate are determined (step 120), wherein:

$$ANUM=Y_E-X_O$$
$$ADEN=X_E+Y_O$$
$$SUMANG=\arctan(ANUM/ADEN)$$

After the summed value has been obtained, a difference value of a carrier and symbol phase estimate is obtained (step 130), wherein $$BNUM=Y_E+X_O$$
$$BDEN=X_E-Y_O$$
$$DIFANG=\arctan(BNUM/BDEN)$$

The initial carrier phase error estimate THETAHAT is then determined as follows (step 140):

$$\frac{(SUMANG+DIFANG)}{2}$$

The initial symbol phase error estimate TAUHAT is then determined as follows (step 150):

$$\overline{(SUMANG-DIFANG)}\over 2$$

Next, an apparatus that implements the carrier and symbol acquisition unit will be described with reference to FIG. 4. The apparatus consists of adders 9–12 and 16–17, inverters 7, 8 and 15, arc tangent look-up tables 13 and 14 and divide by 2 logic units 18 and 19.

The first step in obtaining the initial phase estimates is to generate sum and difference values. The sum value is obtained by inputing correlation values $X_O$, $X_E$, $Y_O$, and $Y_E$ into adders 9 and 10 and inverter 7 as shown in FIG. 4. Arc tangent look-up table 13 then receives the outputs from adders 9 and 10, ANUM and ADEN, respectively, and outputs the sum value.

Figure 4:
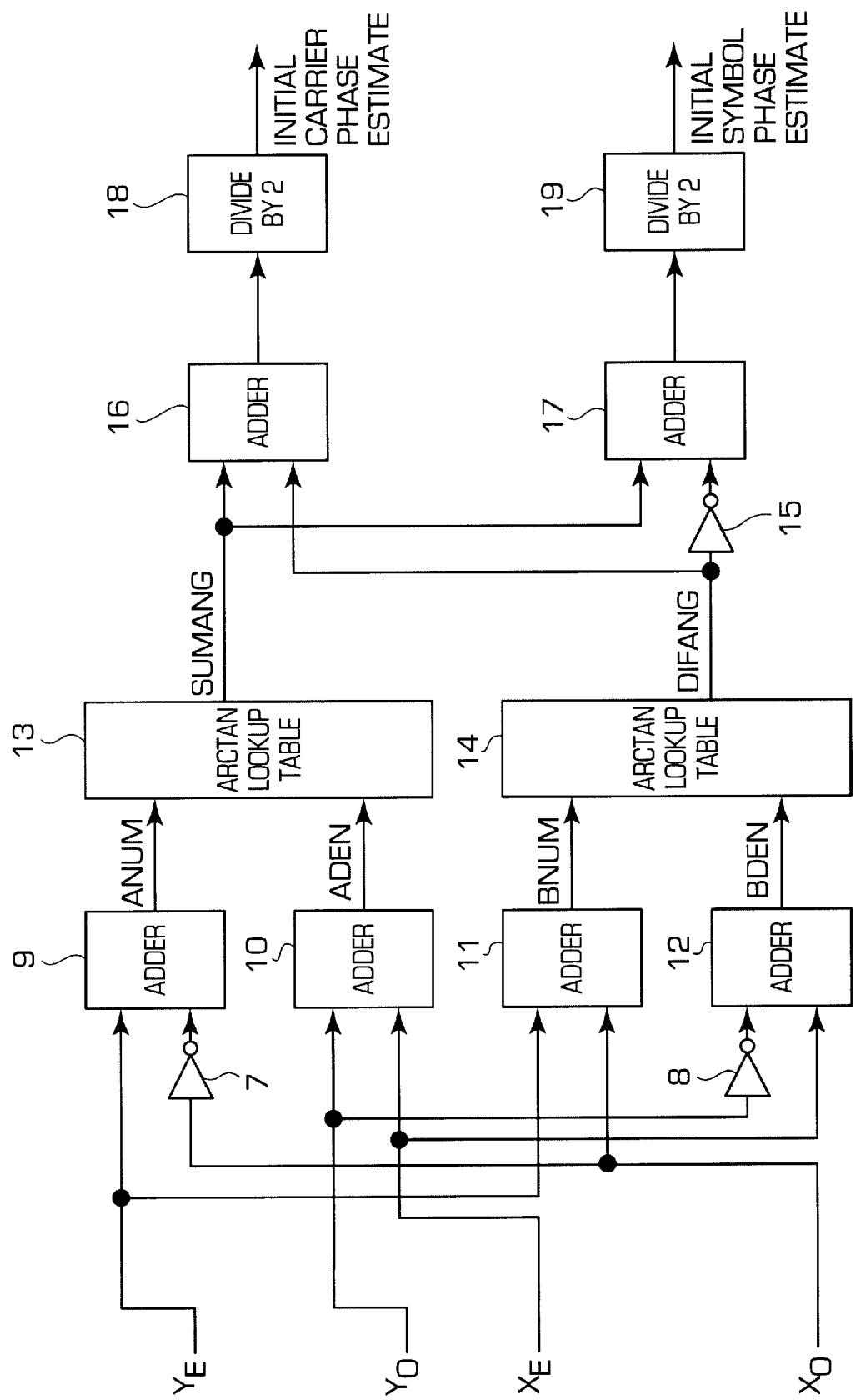
FIG. 4 is a diagram of the carrier and symbol acquisition unit according to the present invention.

Next, the difference value is obtained by inputing correlation values $X_O$, $X_E$, $Y_O$, and $Y_E$ into adders 11 and 12 and inverter 8 as shown in FIG. 4. Arc tangent look-up table 14 then receives the outputs from adders 11 and 12, BNUM and BDEN, respectively, and outputs the difference value. Note that the order in which the sum and difference values are obtained is not important to the invention.

The initial carrier phase estimate is obtained by inputing the sum and difference values into adder 16 and dividing the output of adder 16 by 2 in divide by 2 unit 18.

The initial symbol phase estimate is obtained by inputing the sum and difference values into adder 17 and inverter 15 as shown in FIG. 4 and dividing the output of adder 17 by 2 in divide by 2 unit 19.

While the above is a description of the invention in its preferred embodiment, various modifications and equivalents may be employed. Therefore, the above description and illustration should not be taken as limiting the scope of the invention which is defined by the claims.

What is claimed is:

1. In a burst mode digital communication system, an apparatus for obtaining initial carrier and symbol phase estimates for use in synchronizing transmitted signals containing a binary phase shift keying (BPSK) preamble, comprising:

a plurality of means for adding components of complex time domain samples, wherein at least one of said components is inverted by a first inverting means, which is connected to at least one of said component adding means, prior to being input into at least one of said component adding means, and at least another of said components is inverted by a second inverting means, which is connected to at least another of said component adding means, prior to being input into at least another of said component adding means;

first and second means, each connected to at least one of said component adding means, for looking up arc tangents of values output from said plurality of complex component adding means;

fourth and fifth means, each connected to at least one of said first and second means, for adding values output from said first and second look up means; and a third means, connected to at least one of said first and second means and connected to at least one of said fourth and fifth means, for inverting at least one of said values output from said first and second look up means.

2. The apparatus for obtaining initial carrier and symbol phase estimates for use in synchronizing transmitted signals containing a binary phase shift keying (BPSK) preamble, according to claim 1, further comprising:

sixth and seventh means, each connected to at least one of said fourth and fifth means, for dividing values output from said fourth and fifth means and outputting at least one of a carrier phase estimate and a symbol phase estimate.

3. In a burst mode digital communication system, an apparatus for obtaining initial carrier and symbol phase estimates for use in synchronizing transmitted signals containing a binary phase shift keying (BPSK) preamble, comprising:

a plurality of adder circuits that add components of complex time domain samples, wherein at least one of said components is inverted by a first inverter circuit, which is connected to at least one of said adder circuits, prior to being input into at least one of said component adder circuits, and at least another of said components is inverted by a second inverter circuit, which is connected to at least another of said adder circuits, prior to being input into at least another of said component adder circuits;

first and second circuits, each connected to at least one of said component adder circuits, that look up arc tangents of values output from said plurality of component adder circuits;

fourth and fifth adder circuits, each connected to at least one of said first and second circuits, that add values output from said first and second look up circuits; and a third inverter circuit, connected to at least one of said first and second circuits and connected to at least one of said fourth and fifth circuits, that inverts at least one of said values output from said first and second look up means.

4. The apparatus for obtaining initial carrier and symbol phase estimates for use in synchronizing transmitted signals containing a binary phase shift keying (BPSK) preamble, according to claim 3, further comprising:

sixth and seventh circuits, each connected to at least one of said fourth and fifth circuit, for dividing values output from said fourth and fifth circuits and outputting at least one of a carrier phase estimate and a symbol phase estimate.

5. The apparatus for obtaining initial carrier and symbol phase estimates for use in synchronizing transmitted signals containing a binary phase shift keying (PSK) preamble, according to claim 4, wherein said first and second circuits each comprise an arc tangent look up table.

6. The apparatus for obtaining initial carrier and symbol phase estimates for use in synchronizing transmitted signals containing a binary phase shift keying (BPSK) preamble, according to claim 3, wherein said first and second circuits each comprise an arc tangent look up table.

7. In a burst mode digital communication system, a method for obtaining initial carrier and symbol phase estimates for use in synchronizing transmitted signals containing a binary phase shift keying (BPSK) preamble, said method comprising:

sampling in-phase and quadrature samples of a BPSK preamble at a rate of $N_S$ samples per symbol, wherein $N_S$ is an integer greater than 1;

obtaining correlation values;

determining a sum value of a carrier and symbol phase estimate based on said correlation values;

determining a difference value of a carrier and symbol phase estimate based on said correlation values;

determining an initial carrier phase error estimate based on a summation of said sum value and said difference value; and determining an initial symbol phase error estimate based on a difference of said sum value and said difference value.

8. The method for obtaining initial carrier and symbol phase estimates for use in synchronizing transmitted signals containing a binary phase shift keying (BPSK) preamble according to claim 7, wherein:

said obtained correlation values are $X_O$, $X_E$, $Y_O$ and $Y_E$;

in determining a sum value of a carrier and symbol phase estimate, $$ANUM = Y_E - X_O$$

$$ADEN = X_E + Y_O$$

$$SUMANG = \arctan(ANUM/ADEN)$$

in determining a difference value of a carrier and symbol phase estimate, $$BNUM = Y_E + X_O$$

$$BDEN = X_E - Y_O$$

$$DIFANG = \arctan(BNUM/BDEN)$$

said initial carrier phase error estimate is equal to:

$$\frac{(SUMANG + DIFANG)}{2}; \text{ and}$$

said initial symbol phase error estimate is equal to:

$$\frac{(SUMANG - DIFANG)}{2}.$$

* * * * *